United States Patent [19]

Ewing

[11] Patent Number: 5,040,559
[45] Date of Patent: Aug. 20, 1991

[54] MODULATING POSITIVE SHUTOFF MECHANISM

[75] Inventor: James H. Ewing, Lexington, Mass.

[73] Assignee: MKS Instruments, Inc., Andover, Mass.

[21] Appl. No.: 498,006

[22] Filed: Mar. 23, 1990

Related U.S. Application Data

[63] Continuation-in-part of Ser. No. 307,676, Feb. 6, 1989, abandoned.

[51] Int. Cl.⁵ ............................................. F16K 31/06
[52] U.S. Cl. .................................. 137/1; 251/129.03; 251/129.08; 251/282
[58] Field of Search .............. 137/1; 251/61.5, 129.03, 251/129.05, 129.08, 282

[56] References Cited

U.S. PATENT DOCUMENTS

| | | | |
|---|---|---|---|
| 3,059,667 | 10/1962 | Coceano | 137/533.15 X |
| 3,799,498 | 4/1974 | Wickham et al. | |
| 3,861,643 | 1/1975 | Moffatt | 251/129.08 |
| 4,335,744 | 6/1982 | Bey | 251/63.5 |
| 4,534,375 | 8/1985 | Fox | |
| 4,557,527 | 12/1985 | Stumpe | 251/129.03 |
| 4,620,561 | 11/1986 | Brewer | 137/116.3 |
| 4,721,284 | 1/1988 | Bankard | 251/61.5 |
| 4,765,587 | 8/1988 | Cummins | 251/129.05 |

FOREIGN PATENT DOCUMENTS

842572 6/1952 Fed. Rep. of Germany .

*Primary Examiner*—Robert G. Nilson

[57] ABSTRACT

A system is utilized for controlling the flow of process fluid between an input port and an output port of a valve. A first mechanism controls the modulation of the valve and a second mechanism controls the positive shutoff. An electrical system is responsible for modulation adjustments and a pneumatic system is responsible for positive shutoff control. A third, hydraulic, system is responsible for equalizing the pressure of the process fluid within the valve.

27 Claims, 5 Drawing Sheets

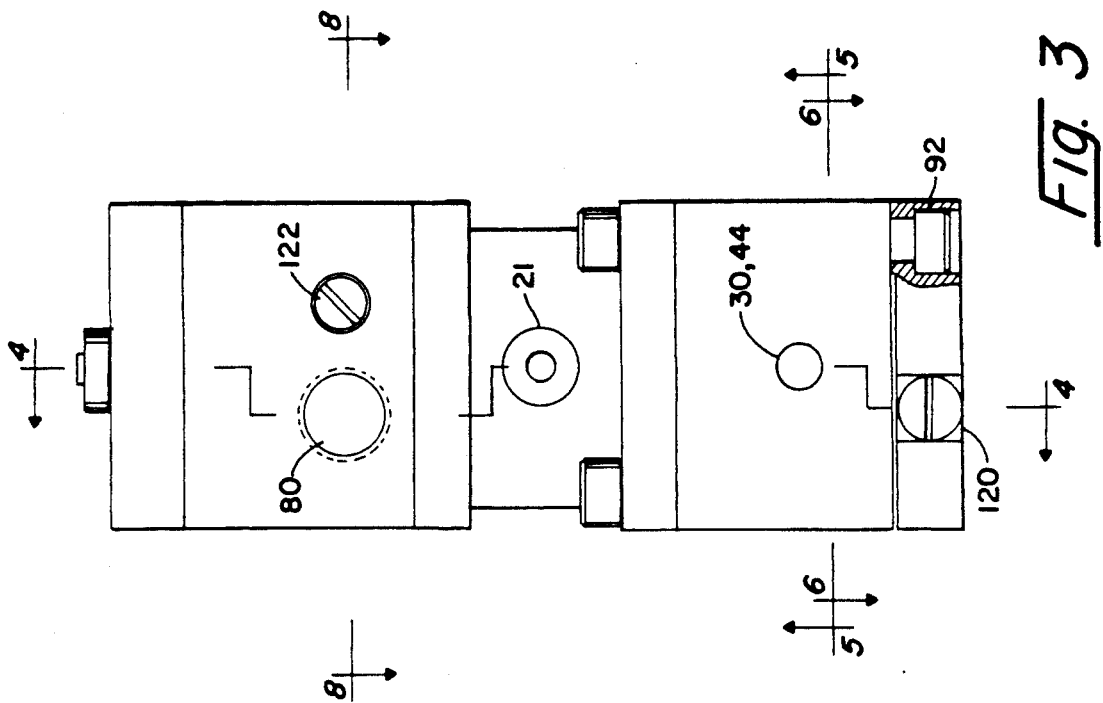
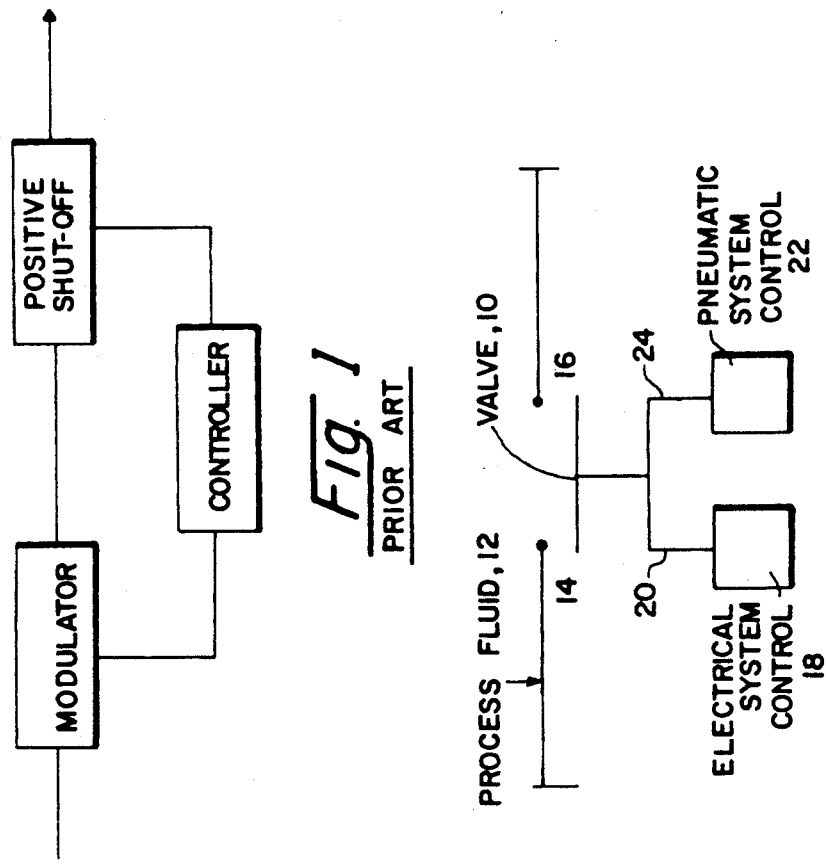
Fig. 1 PRIOR ART
Fig. 2
Fig. 3

MODULATING POSITIVE SHUTOFF MECHANISM

This application is a continuation in part of application Ser. No. 307,676 filed on Feb. 6, 1989, now abandoned.

BACKGROUND OF THE INVENTION

The present invention relates to controlling the flow of fluids such as gases.

The prior art, as illustrated in FIG. 1, describes controlling fluid in a fluid path with a flow control system having a positive shutoff valve located downstream of a modulator valve. An example of a modulator is proportional control valve available from MKS Instruments, Inc. under the trade designation 248 valve. In this valve, an armature assembly is suspended and centered in the valve body by a top spring and a bottom spring. The bottom spring is dual purpose and provides both centering and closing force while the top spring provides only centering force. Located in such a fashion, the armature may be lifted by varying displacements by a solenoid coil, thereby controlling flow.

In operation of this valve, gas enters the valve and flows into the valve chamber. As the armature is lifted by the solenoid, fluid flows through an orifice assembly, a side drill passage and out of the valve. The valve seat contains an elastomeric plug which bears on the orifice. However, because of the low seating pressure and the permation rate of gases through the elastomeric material, positive shutoff is not possible. Thus, a modulation valve of this type must be utilized in cooperation with a positive shutoff valve to achieve the desired dual purpose of modulation and positive shutoff.

A controller controls both valve and modulator. This system creates a dead volume of unknown pressure and volume between the components that needs to be purged or flushed from the system. To address this situation, the prior art has provided a flow system which produces a gas flow having sharp leading and trailing edges (i.e. no dead volume) by providing extra hardware such as tubes and pumps to the flow control system described above.

SUMMARY OF THE INVENTION

In general, one aspect of the invention features an apparatus for controlling the flow of process fluid between an input port and an output port. The apparatus includes a valve, positioned between the respective ports, a first actuator mechanism for operating the valve to cause process fluid to flow between these two ports at a predetermined rate, and a second actuator mechanism adapted to be selectively activated to close the valve to shut off process fluid between the two ports.

In preferred embodiments of the invention, the valve includes two sealing elements (e.g., a valve ball and a seat for the valve ball) in the process fluid flow path which are metal (e.g., 440 Stainless Steel) or material (e.g., tungsten carbide) of metallic hardness (e.g. Rockwell hardness C of at least 45), as opposed to elastomeric material. These sealing elements are positioned between the input and output ports and are forced together by the first actuator to control flow rate and by the second actuator to shut off process fluid flow between the parts.

Preferred embodiments of the invention also include following features. The mechanism utilized for modulation (the first actuator mechanism) has a rapid response time and a closing force incapable of achieving a positive shutoff (i.e. no leakage of process fluid through the valve). In other words, the first actuator provides a force substantially (e.g., at least two and even three or more orders of magnitude) less than closing force of the second actuator. The first actuator may include a frictionless solenoid coil in combination with ferromagnetic and nonferromagnetic members in the valve to achieve rapid response during modulation. In fact, the first mechanism effects process fluid profiles whose duration is less than 0.5 seconds, using low current (0–100 M.A.).

Additionally, in preferred embodiments, the mechanism utilized for valve shutoff includes a resilient bias having a high enough force (e.g. high force springs having a compressed strength of seven pounds) to achieve valve shutoff such that leakage cannot be detected by a helium leak detector having a sensitivity $1 \times 10^{-10}$ sccs He (cubic centimeters per second of Helium at standard temperature and pressure conditions). The valve shut-off actuator is capable of at least one of the valve sealing elements (e.g. the outlet port), thus shuting off the valve. The high-force resilient bias is loaded and unloaded by a pneumatic system. When the high force is loaded, the valve may be actuated by the first actuator to control flow rate.

A hydraulic system is utilized in the valve for maintaining the solenoid assembly in equilibrium, regardless of the variations in process fluid pressure on the assembly experienced in ordinary time. The equilibrium is accomplished by surrounding a flexible bellows chamber, acting as a linear spring, with incompressible hydraulic fluid (for example, DC704 oil) on one side and process fluid on the other. This feature transfers process fluid pressure changes to the oil side where they are absorbed into the system. Thus, the diaphragm and bellows act as a controller to compensate for change in the process fluid flow pressure. This controller can be adjusted (by external adjustment of the hydraulic pressure) to bias the valve and effect seating elements.

The advantages of this system are many. First, a single valve is employed to accomplish both features of modulation and positive shutoff, tending to overcome, problems experienced while utilizing two valves for these purposes. Additionally, the two features are maintained in separate aspects of the single valve. Therefore, the valve can modulate flow with a rapid response time and can effectively seal the valve in a positive shutoff condition.

Other features and advantages of the invention will be apparent from the following description of a preferred embodiment from the claims.

DETAILED DESCRIPTION OF THE PREFERRED EMBODIMENT

FIG. 1 illustrates a valve system of the prior art.

FIG. 2 schematically illustrates a modulating positive shutoff valve and system controllers.

FIG. 3 illustrates a diagrammatic view of the exterior of the valve.

Figure 4:
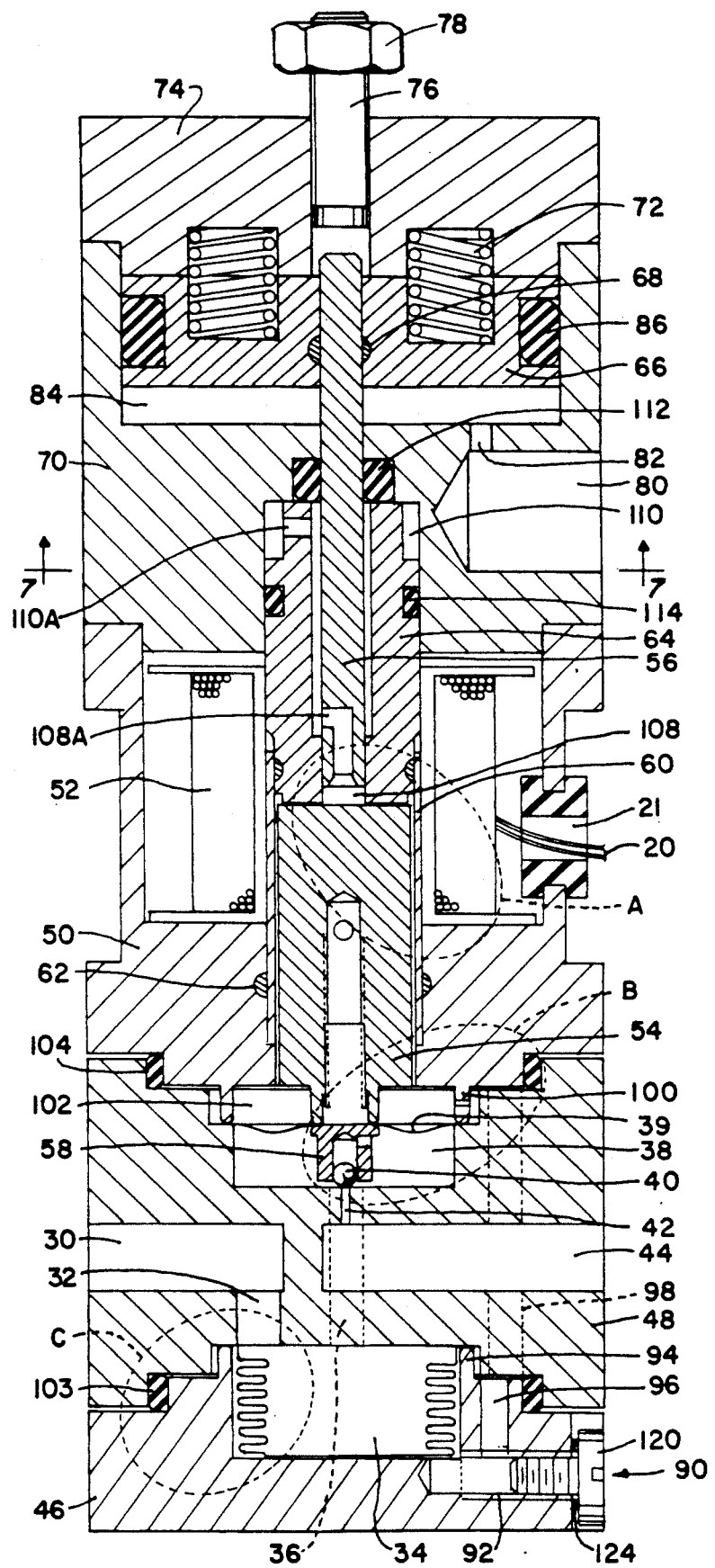
FIG. 4 illustrates a diagrammatic view of a cross section along lines 4—4 of the valve depicted in FIG. 3.
Figure 4A:
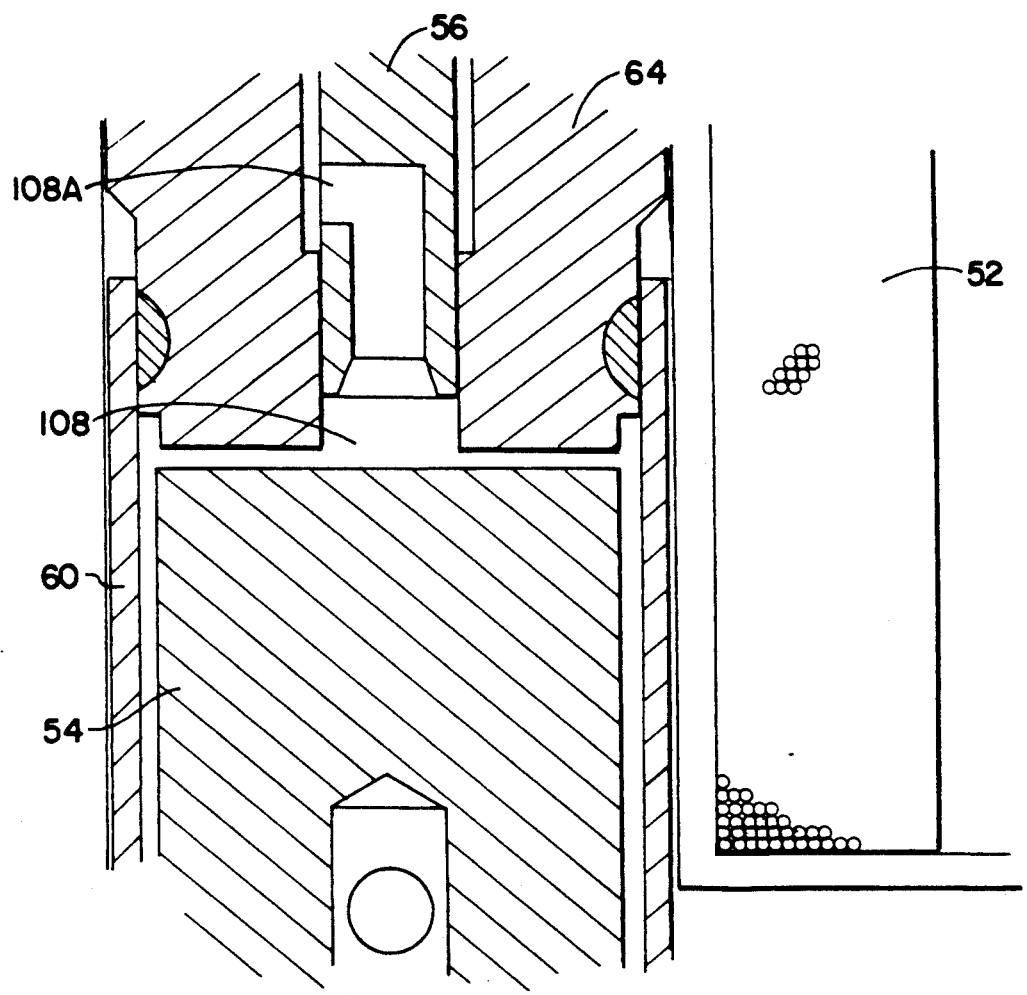
Figure 4B:
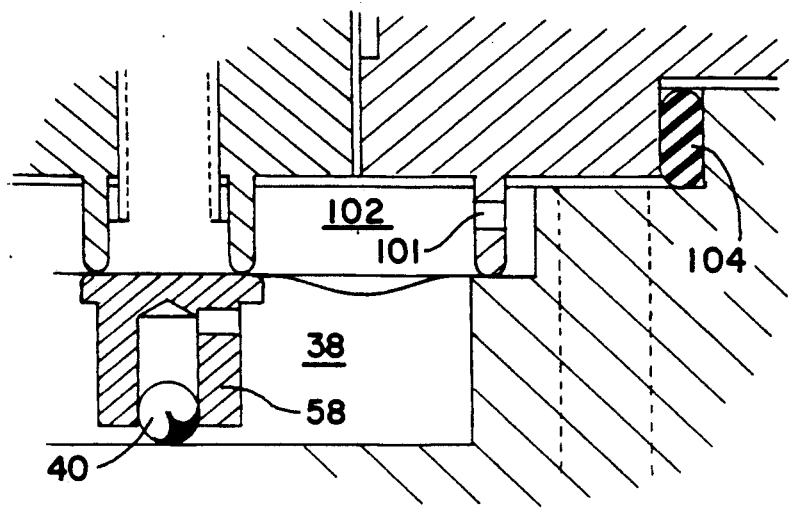
Figure 4C:
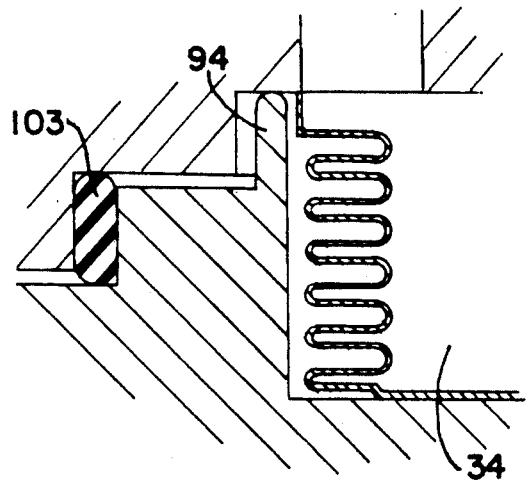

FIGS. 4A–C illustrate enlarged views of details of FIG. 4.

Figure 5:
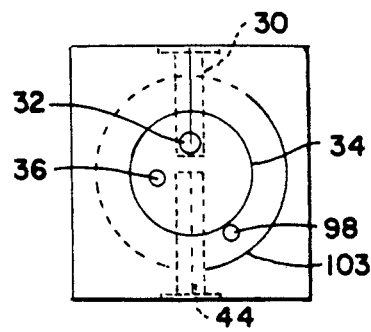

FIG. 5 illustrates a diagrammatic cross sectional view along lines 5—5 of FIG. 3.

Figure 6:
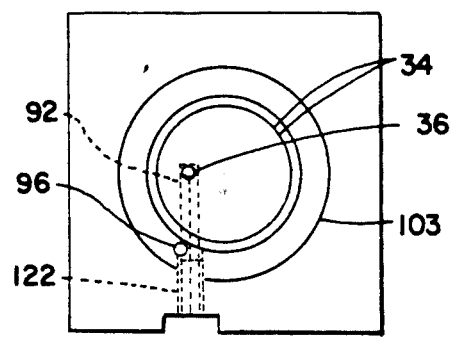

FIG. 6 illustrates a diagrammatic cross sectional view along lines 6—6 of FIG. 3.

Figure 7:
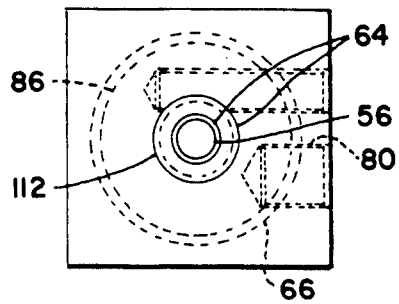

FIG. 7 illustrates a diagrammatic cross sectional view along lines 7—7 of FIG. 4.

Figure 8:
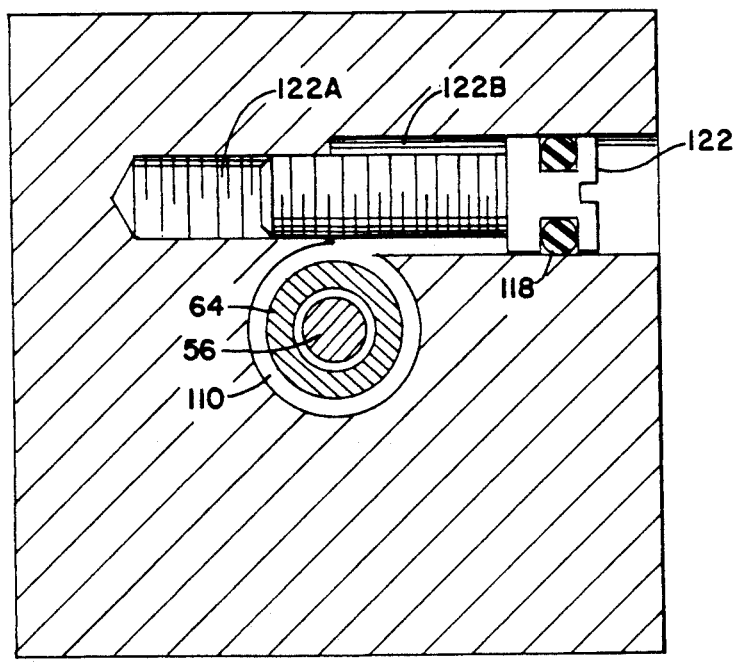

FIG. 8 illustrates a diagrammatic cross section view along lines 8—8 of FIG. 3.

The valve 10, schematically depicted in FIG. 2, is utilized for modulating and shutting off fluid flow of a process fluid 12 as it flows from a valve input port 14 to a valve output port 16. The modulation is controlled by an electrical controller 18 (i.e. a standard PID controller) utilizing an electrical cable 20 as the interface between controller and valve. The shutoff is controlled by a pneumatic system control 22 utilizing a variation in air pressure through pneumatic line 24 to positively shut off the process fluid flow.

FIGS. 3-8 illustrate the valve in detail. The process fluid path includes process fluid (usually a gas) which enters the valve through input port 30. It travels through passageway 32 and into bellows cavity 34. The bellows cavity is a hollow chamber having walls made up of horizontal ridges which expand as a linear spring when the cavity fills with process fluid (much like an accordion). Next, the process fluid travels through passageway 36 and into fluid side diaphragm chamber 38 including diaphragm 39. Valve ball 40 acts to modulate or seal the process fluid path by seating in passageway 42. When valve ball 40 is not sealingly seated in passageway 42, the process fluid can continue to travel through passageway 42 and exit through valve output port 44. The process fluid path is constructed entirely of metal and all sealing is performed by metal to metal seals (usually seals are made of gold plated stainless steel). The metal helps to prevent negative effects achieved by a elastomeric seals such as outgassing in a vacuum and adding inpurities to the process fluid.

The major valve structure is as follows. The valve body is cylindrically shaped and includes cylindrical stainless steel base 46. Seated in the base is a hollow, nickel bellows 34 which has been described above. Atop of the base, a stainless steel process fluid structure 48 includes all the above described process fluid paths embodied as apertures in the stainless steel block 48. Further upwards, the solenoid housing 50, made of ferromagnetic material, encloses the cylindrical frictionless solenoid coil 52.

Inside the solenoid housing, armature weldment 54 is also constructed of ferromagnetic material. Piston rod 56 is positioned atop armature weldment 54, however, they are free to move independently of one another. The armature weldment 54 is attached to the ball retainer 58, which in turn holds stainless steel ball 40. Welded to the solenoid housing 50 is cylindrical sleeve 60 which is constructed of nonferromagnetic material. The weld 62 solidifies the sleeve to the housing. Additionally, nonferromagnetic armature guide 64 is welded to the sleeve 60 to create a solid housing. A piston 66 is attached to piston rod 56 by welds 68. The piston is contained in stainless steel upper alignment block 70. A plurality of high force springs 72 (two of which are shown), each having a compressed strength of 7 pounds, are set between the piston and the stainless steel cap section 74. Threaded displacer 76 and corresponding screw nut 78 adjust the distance that the piston rod 56, and hence, the piston 66 can retract.

The valve includes three fluid paths: a process fluid path, a pneumatic path, and a hydraulic path. The process fluid path was described above. The pneumatic path (usually containing air) is as follows. Air enters through air inlet channel 80 situated in upper alignment block 70 and travels via passageway 82 into piston chamber 84. There, it is pressurized up to 50 to 75 psi. O-ring sealing member 86 prevents leakage of the air between piston 66 and upper alignment block 70.

The hydraulic path contains oil (specifically DC704 oil) in the preferred embodiment. DC704 oil initially is input to the system at fill location 90 (FIG. 4). Beginning at oil fill 90, the oil fills tank 92 and bifurcates into two paths. Path one fills the cavity between bellows 34 and stainless steel base 46 (see FIG. 4C) and is sealed by metal seal 94 and O-ring seal 103.

Path two fills channels 96, 98, past metal seal 100 through aperture 101 and into oil side diaphragm chamber 102. Oil leakage is contained by o ring sealing member 104. The oil fills the space between armature weldment 54 and sleeve 60 (see FIG. 4B) and then fills cavity 108. Next, via passage 108A, the oil fills the space between piston rod 56 and armature guide 64 (see FIG. 4A) and (via opening 110A) it fills to cylindrical cavity 110 where it meets the piston displacer 122 (FIG. 8). The oil leakage is contained by o-rings 112, 114, 118. Piston displacer 122 is utilized to adjust the oil path pressure. Oil pressure is maintained without leakage utilizing o-ring sealing members 118, 124. Once the oil path is initially filled, it is maintained as a closed system and all future pressure adjustments performed solely by utilizing piston displacer 122. Specifically, piston displacer 122 is seated in a cylindrical bore which has a threaded portion 122A and a portion 122B of slightly greater diameter which communicates with cavity 110. Thus tightening displacer 122 reduces the volume of the oil path and increases pressure in chamber 102 above the diaphragm. It will be understood that the oil path described above extends between some small clearances that cannot be fully depicted in scale drawings.

In operation, process fluid enters cavity 30 and travels through passageway 32 until it reaches bellows cavity 34. Under the pressure of the incoming process fluid, the bellows cavity expands like a linear spring to accommodate the increased volume within it. This expansion of the bellows cavity exerts pressure on the oil contained in the cavity outside of the bellows. Because oil is incompressible, the expanding bellows pushes additional oil into oil side diaphragm chamber 102 in proportion to the increase in process fluid pressure in the process fluid path, and hence, in proportion to the pressure in fluid side diaphragm chamber 38. Therefore, the pressure differential across operation diaphragm 39, as preset by piston displacer 122, is maintained constant. Utilizing piston displacer 122 (FIG. 8) a "preload force" can be applied to the diaphragm by decreasing the total oil path volume and thereby increasing the oil pressure. This preload force is merely a few ounces and is therefore unable to counteract the forces created from the solenoid coil 52 or the high force springs 72 It only acts to maintain the ball 40 in its predetermined position.

During modulation, the piston chamber 84 is pressurized with air to maintain the piston 66 and piston rod 56 up off the armature weldment 54. In this way, only the forces created by the frictionless solenoid coil 52 act to move the armature weldment 54, ball retainer 58, and ball 40 off of its seat 42. Solenoid coil 52 is powered by electrical line 20 capable of delivering a signal of up to 100 milliamps of current; the signal being controlled by a standard proportional intergral derivative (PID) controller. The electrical cable enters the valve through aperture 21. The coil 52 creates a field of flux lines in the ferromagnetic parts: solenoid housing 50 and armature weldment 54, to force the armature weldment to move in response to the electrical signals, thereby controlling the modulation of the valve. Sleeve 60 is constructed of nonferromagnetic material and therefore is not affected by the lines of flux. This feature further solidifies the structure of the nonmoving valve parts. The system creates a fast reacting modulation and because the solenoid coil has a lag time of only microseconds, sharp gas profiles produced by the rapid modulation have a duration of less than 0.5 seconds.

During positive shutoff, the piston chamber 84 is depleted of its air pressure by a pneumatic signal 24 which controls the amount of air in the chamber. Therefore, the high force springs 72 force the piston 66 to the bottom of chamber 84 (which, in actuality, is less than 0.01 inches of total travel), thereby forcing piston rod 56 to forceably contact armature weldment 54 and cause it to displace downward. The movement of the armature weldment (which, in actuality, is less than 0.003 inches) causes stainless steel ball 40 to elastically deform in passageway 42 under a pressure of 140,000 psi thereby sealing the process fluid path and positively shutting off the process flow to a maximum sensitivity of a commerical helium leak detector: $1 \times 10^{-10}$ sccs He.

There is also a condition called soft shutoff in which the piston chamber 84 is filled with air, but the solenoid coil is not in operation. In this case, the valve ball 40 seals from the from the force created, preloading of the bellows, placing about 20 psi of additional pressure (above process pressure) in the oil which is transmitted to the diaphram and thus to the ball 40. This creates a seal which controls leaks up to about a 0.1 sccs He.

Other embodiments of the invention are within the following claims.

What is claimed is:

1. Apparatus for controlling the flow of process fluid between an input port and an output port, comprising
   a valve positioned between said input port and said output port,
   a first actuating mechanism for operating said valve to control the rate of flow of process fluid between said input port and said output port, and
   a second actuating mechanism for engaging said valve to close said valve and substantially shut off process fluid flow between said input port and said output port, said second actuating mechanism being constructed to be selectively disengaged from said valve to permit said first actuating mechanism to operate said valve.

2. The apparatus of claim 1 wherein said valve comprises two sealing elements which are positioned between the input port and the output port, the first actuating mechanism moving one of said sealing elements with respect to the other to control the rate of flow, the second actuating mechanism forcing said sealing elements together to shut off fluid flow.

3. The apparatus of claim 2 wherein at least one of said sealing elements comprises tungsten carbide.

4. The apparatus of claim 2 wherein said sealing elements comprise nonelastomeric material.

5. The apparatus of claim 4 wherein said material has a Rockwell Hardness C of at least 45.

6. The apparatus of claim 2 wherein said sealing elements comprise metal.

7. The apparatus of claim 6 wherein said elements comprise stainless steel.

8. The apparatus of claim 1 wherein the first actuating mechanism operates the valve with a rapid response time and a closing force which is substantially less than the closing force of said second actuating mechanism.

9. The apparatus of claim 1 wherein the first actuating mechanism is operated by an electrical system.

10. The apparatus of claim 9 wherein the electrical system includes a solenoid coil magnetically coupled to said valve, said coil being arranged so that current conducted through said coil causes said valve to be operated.

11. The apparatus of claim 10 wherein said valve comprises a pair of sealing elements one of which is attached to a ferromagnetic member, said current conducted in said coil generating flux that causes movement of said ferromagnetic member to operate said valve.

12. The apparatus of claim 10 wherein the rate of process fluid flow corresponds to the current level conducted in said solenoid.

13. The apparatus of claim 12 wherein said coil is adapted to respond to current between zero and one hundred milliamps to operate said valve.

14. The apparatus of claim 10 wherein the solenoid coil creates sharp gas profiles whose duration is less than 0.5 seconds.

15. The apparatus of claim 1 wherein the first mechanism is controlled by PID controller.

16. The apparatus of claim 1 wherein the first actuating mechanism comprises a controller to compensate for change in the process fluid flow pressure.

17. The apparatus of claim 16 wherein a soft shutoff condition is achieved by said means to compensate for change in the process fluid flow pressure.

18. The apparatus of claim 17 wherein the valve can shut off process fluid flow of 0.1 sccm He.

19. The apparatus of claim 1 wherein the second actuating mechanism comprises a high force resilient bias for engaging said valve to close said valve.

20. The apparatus of claim 19 wherein the second actuating mechanism comprises a pneumatic system positioned to load the high force resilient bias and disengage said high force resilient bias from said valve in order to permit valve control by said first actuating mechanism.

21. The apparatus of claim 20 wherein the high force resilient bias comprises high force springs having a compressed strength of 7 pounds.

22. The apparatus of claim 20 wherein the high force springs cause deformation of at least one of the sealing elements.

23. The apparatus of claim 1 wherein the second mechanism can shut off process fluid flow to $1 \times 10^{-10}$ sccs He.

24. The apparatus of claim 1 wherein the second mechanism can shut off process fluid flow to $1 \times 10^{-10}$ sccs He.

25. A method for controlling the flow of process fluid between an input port and an output port with a valve positioned between said input port and said output port, comprising
   operating said valve with a first actuating mechanism to cause said process fluid to flow between said input port and said output port at a predetermined rate, engaging said valve with a second actuating mechanism to close said valve and substantially shut off process fluid flow between said input port and said output port, and selectively disengaging said second actuating mechanism from said valve to permit said first actuating mechanism to operate said valve.

26. A valve for controlling process fluid flow, comprising

A. an input port, an output port, and at least one passageway therebetween that defines a fluid path, said valve being constructed so that said passageway is disposed through material of metallic hardness;

B. a valve ball positioned in said fluid path and constructed for movement toward and away from a valve seat to control a rate of flow of said process fluid through said fluid path;

C. a preload path including a second fluid in position to maintain a preload force on said valve ball via a diaphragm positioned between said second fluid and said process fluid, and means for controlling pressure in said preload path in response to pressure of said process fluid;

D. a first actuator for operating said valve to modulate said rate of flow of said process fluid through said fluid path, said first actuator including:

a ferromagnetic member coupled to said valve ball;

a solenoid coil for conducting electrical current, said coil being positioned so that flux generated by said current conduction causes said ferromagnetic member to move said valve ball with respect to said valve seat to modulate said rate of flow;

E. a second actuator for selectively closing said valve to substantially shut off said process fluid flow through said fluid path, said second actuator including:

a rod for engaging said ferromagnetic member;

at least one spring positioned to expand and cause said rod to engage said ferromagnetic member; and a piston disposed in a chamber and coupled to said springs, said chamber having an inlet for receiving gas, whereby when said gas has a predetermined pressure said gas causes said piston to compress said spring and disengage said rod from said ferromagnetic member to allow said first actuator to operate said valve, and when said gas is below said predetermined pressure, said spring expands to cause said rod to engage said ferromagnetic member and close said valve ball against said valve seat, said valve ball and said valve seat being constructed to form a seal when said valve ball is closed against said valve seat by said spring that substantially prevents said process fluid from flowing through said fluid path.

27. A method for operating a valve that includes a valve member and a valve seat to control flow of process fluid, comprising operating said valve to modulate a rate of said flow of said process fluid by conducting electrical current in a solenoid coil that is positioned so that flux generated by said current conduction causes a ferromagnetic member to move said valve ball with respect to said valve seat;

selectively closing said valve to substantially shut off said process fluid flow using at least one spring positioned to expand and close valve ball against said valve seat with a predetermined closing force, said valve ball and said valve seat being constructed to form a seal in response to said closing force that substantially prevents said process fluid from flowing through said valve;

applying a gas at a predetermined pressure via an inlet of said valve to cause said spring to compress and remove said closing force to allow said valve to be operated to modulate said fluid flow, said selective closing occurring when said predetermined pressure is removed; and applying a preload force on said valve ball with a pressurized second fluid, and controlling the pressure of said second fluid in response to pressure of said process fluid.

* * * * *

UNITED STATES PATENT AND TRADEMARK OFFICE
CERTIFICATE OF CORRECTION

PATENT NO. : 5,040,559

DATED : August 20, 1991

INVENTOR(S) : James H. Ewing

It is certified that error appears in the above-identified patent and that said Letters Patent is hereby corrected as shown below:

Claim 18, column 6, line 39, delete "sccm" and insert therefor -- sccs --; and

Claim 23, column 6, line 56, delete "$1 \times 10^{-10}$" and insert therefor -- $1 \times 10^{-9}$ --.

Signed and Sealed this

Ninth Day of February, 1993

Attest:

STEPHEN G. KUNIN

*Attesting Officer*  Acting Commissioner of Patents and Trademarks